United States Patent
Cherry et al.

(10) Patent No.: US 12,038,352 B2
(45) Date of Patent: Jul. 16, 2024

(54) METHOD OF DETECTING A LEAK IN A HYDRAULIC PITCH SYSTEM

(71) Applicant: Siemens Gamesa Renewable Energy A/S, Brande (DK)

(72) Inventors: Austin Cherry, Orlando, FL (US); Dennon Fortner, Lake Mary, FL (US); Keld Fyhn Andersen, Glejbjerg (DK); Carsten Dalager Bolvig, Hasselager (DK); Kevin Evans, Newtown Powys (GB); Dan Frederiksen, Haderslev (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 423 days.

(21) Appl. No.: 17/610,232

(22) PCT Filed: Apr. 24, 2020

(86) PCT No.: PCT/EP2020/061523
§ 371 (c)(1),
(2) Date: Nov. 10, 2021

(87) PCT Pub. No.: WO2020/233941
PCT Pub. Date: Nov. 26, 2020

(65) Prior Publication Data
US 2022/0349771 A1    Nov. 3, 2022

(30) Foreign Application Priority Data
May 21, 2019    (EP) ..................................... 19175699

(51) Int. Cl.
*G01M 3/26*    (2006.01)
(52) U.S. Cl.
CPC .................... *G01M 3/26* (2013.01)

(58) Field of Classification Search
CPC ....................................................... G01M 3/26
(Continued)

(56) References Cited

U.S. PATENT DOCUMENTS 8,561,397 B2 * 10/2013 Egedal .................. F16N 19/003
60/329
2010/0135801 A1    6/2010 Melius
(Continued)

FOREIGN PATENT DOCUMENTS

CN    102052243 A    5/2011
DE    102007029945 A1    1/2009
(Continued)

OTHER PUBLICATIONS

PCT International Search Report & Written Opinion mailed Oct. 15, 2020 corresponding to PCT International Application No. PCT/EP2020/061523.
(Continued)

*Primary Examiner* — Nathaniel T Woodward
(74) *Attorney, Agent, or Firm* — Schmeiser, Olsen & Watts LLP

(57) ABSTRACT

Provided is a method of detecting a leak in a hydraulic cylinder of a rotor blade pitch system of a wind turbine including a plurality of rotor blades, which method includes the steps of selecting one of the pitch systems to undergo a functionality test; actuating a fluid pump to move the pistons of the hydraulic cylinders of the pitch systems to their outermost positions; monitoring the hydraulic cylinder pressure levels of the non-selected pitch systems while performing the functionality test on the selected pitch system; and analyzing the monitored hydraulic cylinder pressure levels of the pitch systems to detect a drop in pressure in a pitch cylinder of a non-selected pitch system. A leak detection
(Continued)

arrangement of a pitch-controlled wind turbine; and a pitch-controlled wind turbine are also provided.

8 Claims, 4 Drawing Sheets

(58) Field of Classification Search
USPC .............................................. 73/40
See application file for complete search history.

(56) References Cited

U.S. PATENT DOCUMENTS

| | | |
|---|---|---|
| 2012/0290104 A1 | 11/2012 | Holt et al. |
| 2019/0063404 A1* | 2/2019 | Baba .................. F03D 7/024 |
| 2019/0078555 A1 | 3/2019 | Kjær et al. |

FOREIGN PATENT DOCUMENTS

| | | |
|---|---|---|
| EP | 2085622 A1 | 8/2009 |
| EP | 2402596 A2 | 1/2012 |
| WO | 2013079071 A1 | 6/2013 |
| WO | WO-2017063654 A1 * | 4/2017 ........... F03D 7/0224 |
| WO | 2018153524 A1 | 8/2018 |

OTHER PUBLICATIONS

European Search Report and Written Opinion of Application No. 19175699.8, dated Oct. 22, 2019.

Jia Wenqiang et al, Dynamics Load Optimization and Simulation Analysis of Wind Turbine under Independent Pitch Control; 6 pages with English Abstract, 2017.

* cited by examiner

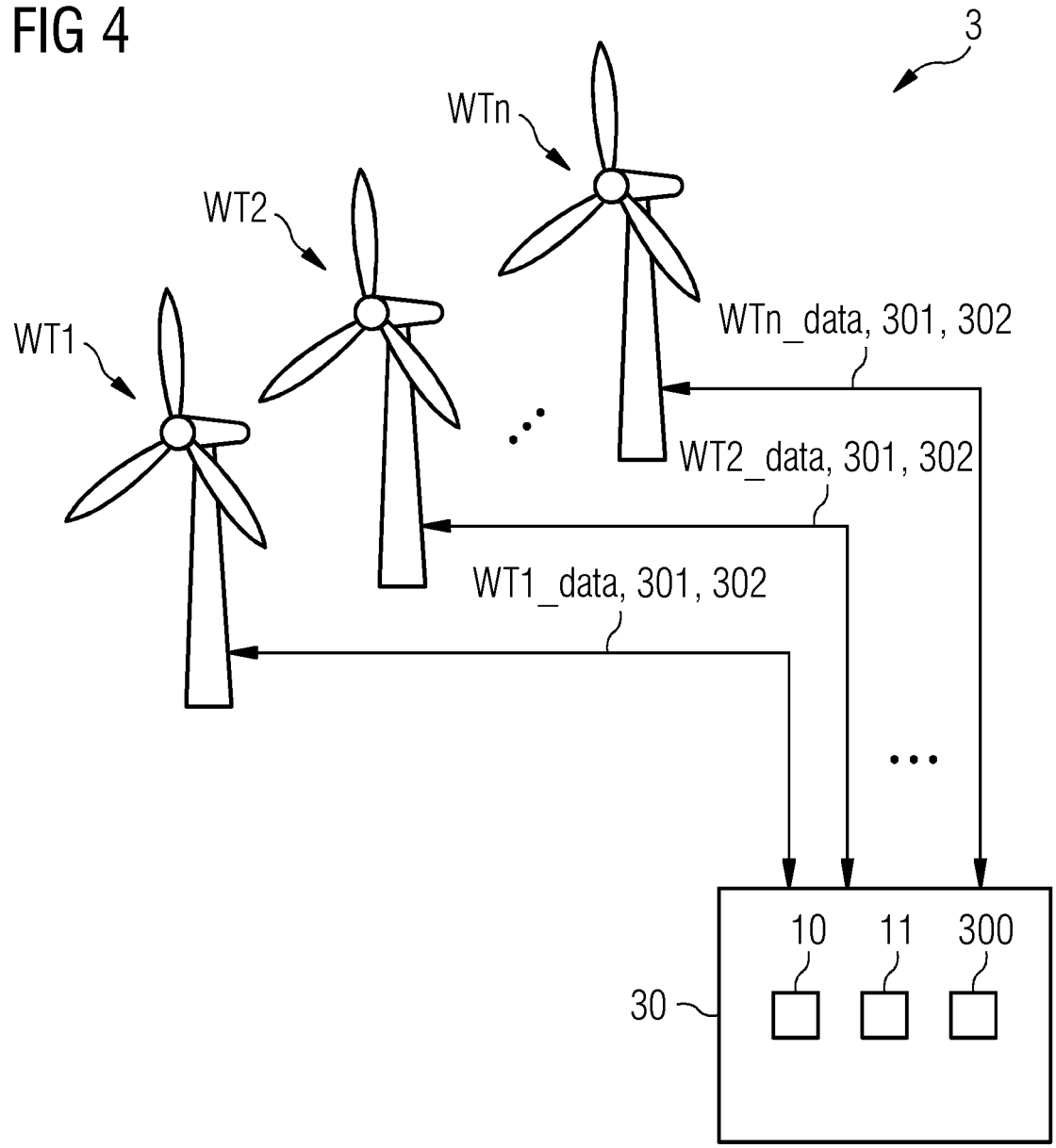

METHOD OF DETECTING A LEAK IN A HYDRAULIC PITCH SYSTEM

CROSS-REFERENCE TO RELATED APPLICATIONS

This application claims priority to PCT Application No. PCT/EP2020/061523, having a filing date of Apr. 24, 2020, which is based off of EP Application No. 19175699.8, having a filing date of May 21, 2019, the entire contents both of which are hereby incorporated by reference.

FIELD OF TECHNOLOGY

The following relates to a method of detecting a leak in a hydraulic cylinder of a wind turbine rotor blade pitch system, and a leak detection arrangement of a pitch-controlled wind turbine.

BACKGROUND

The rotor blade of a wind turbine is generally mounted to the hub by means of a hydraulic pitch system so that the rotor blade can be pitched about its longitudinal axis. In this way, the rotor blade can be pitched into the wind to extract as much energy as possibly from the wind. Equally, the rotor blade can be pitched out of the wind to avoid excessive loading during severe wind conditions.

If a pitch system develops a severe fault that prevents the rotor blade from being correctly pitched, it may be necessary to shut down the wind turbine. Such a severe fault may be the result of undetected minor fault, for example a gradual deterioration of a seal in a pitch cylinder. Downtime may extend over hours or even days, for example when a maintenance procedure must be scheduled for an offshore wind turbine. Downtime is expensive and may have a detrimental effect on the annual energy production (AEP) of the wind turbine. Therefore, it is important to be able to identify the presence of a fault and to localise the fault.

However, it can be difficult to identify a fault and its location in a complex hydraulic circuit such as a rotor blade pitch system. In some cases, unexpected behaviour in a hydraulic circuit may be detected and reported to a wind turbine controller as an alarm. A hydraulic-related alarm may indicate a problem with a hydraulic pump of a pitch system, an unexpected change in pressure, etc. Such alarms are quite general, and often do not clearly identify the actual underlying cause. For example, there may be several reasons for an unexpected change in pressure in the hydraulic circuit. For these reasons, a leak in a pitch cylinder may go undetected until it develops into a severe fault, which can readily be detected but results in the wind turbine having to be shut down.

One way of identifying a leak in a pitch cylinder might be to schedule regular inspection procedures for the wind turbine. The inspection would involve steps of manually closing the valves around the pitch cylinder, applying pressure on the hydraulic cylinders through a pressure nipple, and monitoring the pressure difference across the cylinder. A drop in pressure would indicate a leak in the cylinder. To perform such an inspection would typically require two technicians and several hours for each pitch system (of which there are usually three). Clearly, the costs of such regular inspection procedures would be prohibitive in the case of a wind park with tens or even hundreds of wind turbines.

In an alternative approach, it may be possible to narrow down the number of possible fault candidates in a pitch system by analysing an alarmstack of hydraulic-related alarms recorded over time by the turbine controller. An incoming alarm is generally recorded along with the time, the alarm type, and the sender (e.g. the hydraulic system), so that the pattern of alarms in an alarmstack may give some clue as to the source of a fault. However, since there may be several faults in a hydraulic system at any one time, and because an alarm may be issued for a reason that is not directly related to the actual fault, it can be difficult to arrive at an informative conclusion from analysis of a hydraulic alarmstack.

SUMMARY

An aspect relates to provide an economical and accurate way of detecting a leak in a pitch cylinder of a rotor blade pitch system.

According to embodiments of the invention, the method of detecting a leak in a hydraulic cylinder of a rotor blade pitch system comprises the steps of selecting a pitch system to undergo a functionality test; actuating a fluid pump of the hydraulic circuit to move the pitch cylinder pistons of the selected pitch system—and therefore also the pitch cylinder pistons of the non-selected pitch systems—to their outermost or "stop" positions; monitoring the hydraulic cylinder pressure levels of the selected pitch system and the non-selected pitch systems while performing the functionality test on the selected pitch system; and analysing the monitored hydraulic cylinder pressure levels to detect a drop in pressure in a pitch cylinder of a non-selected pitch system.

In the context of embodiments of the invention, it is assumed that the wind turbine is a pitch-controlled wind turbine with a plurality of rotor blades, usually three. Each rotor blade has a pitch system, so that the number of pitch systems is the same as the number of rotor blades. It is usual to regulate the pitch angles of the rotor blades simultaneously in order to avoid uneven loading effects. In the following, the wind turbine may therefore be assumed to implement the pitch systems in a hydraulic circuit with a common pump and tank, and an accumulator for each pitch system. The pitch systems may be assumed to be realised identically, with identical valve configurations, fluid line diameters, etc.

The step of actuating the hydraulic circuit to move the pistons of the pitch systems their "stop" positions may be understood to comprise actuating a pump to force pressurized fluid into the end chambers of the cylinders until the pistons are fully out, and then regulating the relevant valves to maintain this state. In the context of this document, the terms "hydraulic cylinder" and "cylinder" may be used interchangeably and shall be understood to have the same meaning.

An advantage of the inventive method is that a defective cylinder can quickly be identified, since a drop in pressure observed in a non-selected pitch system would indicate the presence of a leak in a hydraulic cylinder of that pitch system. In this way, it is possible to quickly identify such a defect, so that a maintenance procedure can be scheduled in good time, thereby avoiding unnecessary downtime.

Embodiments of the invention are based on the insight that a faulty pitch can be detected as a "bonus effect" during a routine functionality test being performed on another pitch system. The inventors have recognised that the pistons of all pitch systems will be pushed to their "stop" positions when a functionality test is initiated for a selected pitch system.

Instead of only evaluating the pressure reading from the pitch system that is undergoing the functionality test, the inventors have recognised that the pressure readings from the other two pitch systems may reveal valuable information regarding the health of their pitch cylinders. In the prior art, only the pressure reading from the pitch system currently undergoing a functionality test is collected and evaluated, while the pressure readings from the other two pitch systems are not considered to be of interest.

According to embodiments of the invention, a leak detection arrangement of a pitch-controlled wind turbine comprises an evaluation unit that is configured to receive at least a first input signal identifying a selected pitch system scheduled for a functionality test, and a second input signal defining the duration of that functionality test. The evaluation unit is also configured to receive pressure readings from the pitch systems and to track the temporal progression of a pressure reading. By monitoring a pressure reading in this way, the evaluation unit can identify a fault-indicative reduction in pressure.

A pressure reading from a pitch system may be understood to be a signal that reports the momentary pressure in the end chamber of the pitch cylinder(s) of that pitch system. The pressure reading may be an analogue or a digital signal, and may be reported continually or at regular intervals, depending on the device that is used to measure the pitch cylinder pressure.

According to embodiments of the invention, a pitch-controlled wind turbine of the type described above comprises a scheduler module configured to schedule a functionality test for a selected pitch system and to regulate the hydraulic circuit to move the pistons of all pitch systems to their outermost positions; and an embodiment of the inventive leak detection arrangement to identify a faulty pitch system during a functionality test.

It shall be understood that the wind turbine may be one of many in a wind park, and that the wind turbines may all be controlled by a common park controller. The leak detection arrangement may be partially or completely implemented in a park controller, for example by transmitting the pressure readings of the pitch systems of each wind turbine to the park controller over a suitable communications interface. These can be evaluated in real time, or stored in a memory for evaluation at a later date. The park controller may comprise several instances of the evaluation unit, so that it can evaluate the pressure readings from several wind turbines simultaneously.

The evaluation unit of the leak detection arrangement can be completely or partially realised as software modules running on a processor of a wind turbine control unit. A realisation largely in the form of software modules can have the advantage that applications already installed on an existing system can be updated, with relatively little effort, to carry out the steps of the inventive method.

In the following, the expression "functionality test" may be understood to mean a test routine carried out on a pitch system, and may comprise measures to test one or more aspects of the pitch system, for example a functionality test may monitor the capacity of the accumulators of that pitch system, etc. In the context of embodiments of the invention, the expression "functionality test" is to be understood as a test routine that returns data regarding the functionality of a pitch system, i.e. an assessment of its ability to fulfil its function.

The scheduler module is configured to schedule a functionality test for a pitch system at regular intervals, for example at 120-hour intervals. The functionality tests are carried out sequentially for the pitch systems. During a functionality test, a pitch system is subject to various checks. An exemplary test sequence may comprise the following: the pitch mechanism (and other hydraulic parts) is exercised or actuated; the functionality of the aerodynamic and mechanical brake system is checked; the proportional valves are calibrated; pitch pressure sensor and pitch pressure valve are checked; hydraulic valves are checked. A functionality test may require several minutes to complete.

In a preferred embodiment of the invention, a cylinder pressure level is reported by a pressure sensor of the corresponding pitch system. For example, a pitch system may have a manometer, a pressure transducer, etc. arranged to measure pressure in a fluid intake line to that pitch system. The pressure sensor is realized to provide the measured pressure as a digital signal.

A suitable evaluation unit can receive the pressure readings and process these to detect any anomaly. Generally, when a hydraulic cylinder is in its outermost "stop" position, the pressure in the hydraulic cylinder is at its maximum. In a "healthy" cylinder, this pressure will be maintained until appropriate valves are opened to relieve the pressure, allowing the fluid to drain towards the tank. In a "leaky" cylinder, for example a cylinder with a defective seal, the pressure will drop even if those valves remain closed, since the pressurized fluid is able to pass from the end chamber to the piston rod chamber.

To illustrate the inventive technique when applied to three pitch systems labelled "SA", "SB" and "SC", the method of detecting a leaky pitch cylinder—for example in pitch system SB—can be formulated as a logic expression:
IF during lubrication of pitch system SA:
   pitch cylinder pressure of pitch system SB drops
   AND
   pitch cylinder pressure of pitch system SC stays high
a leaky cylinder is indicated in pitch system SB.

The approach with verification of a leaky pitch cylinder in pitch system SB may be formulated as follows:
If during lubrication of pitch system SA:
   pitch cylinder pressure of pitch system SB drops
   And
   pitch cylinder pressure of pitch system SC stays high
And if during lubrication on pitch system SC:
   pitch cylinder pressure of pitch system SB drops
   And
   pitch cylinder pressure of pitch system SA stays high
Then
   confirmation of a leaky cylinder in pitch system SB.

In a preferred embodiment of the invention, the method comprises a step of reporting the occurrence of a fault-indicative reduction in pressure for a non-selected pitch system. This fault may be reported to a control unit, which can then respond by informing service personnel and/or by scheduling a service routine for that pitch system of that wind turbine.

BRIEF DESCRIPTION

Some of the embodiments will be described in detail, with reference to the following figures, wherein like designations denote like members, wherein:

FIG. 4 shows a wind park implementing an embodiment of the inventive leak detection arrangement.

DETAILED DESCRIPTION

Figure 1:
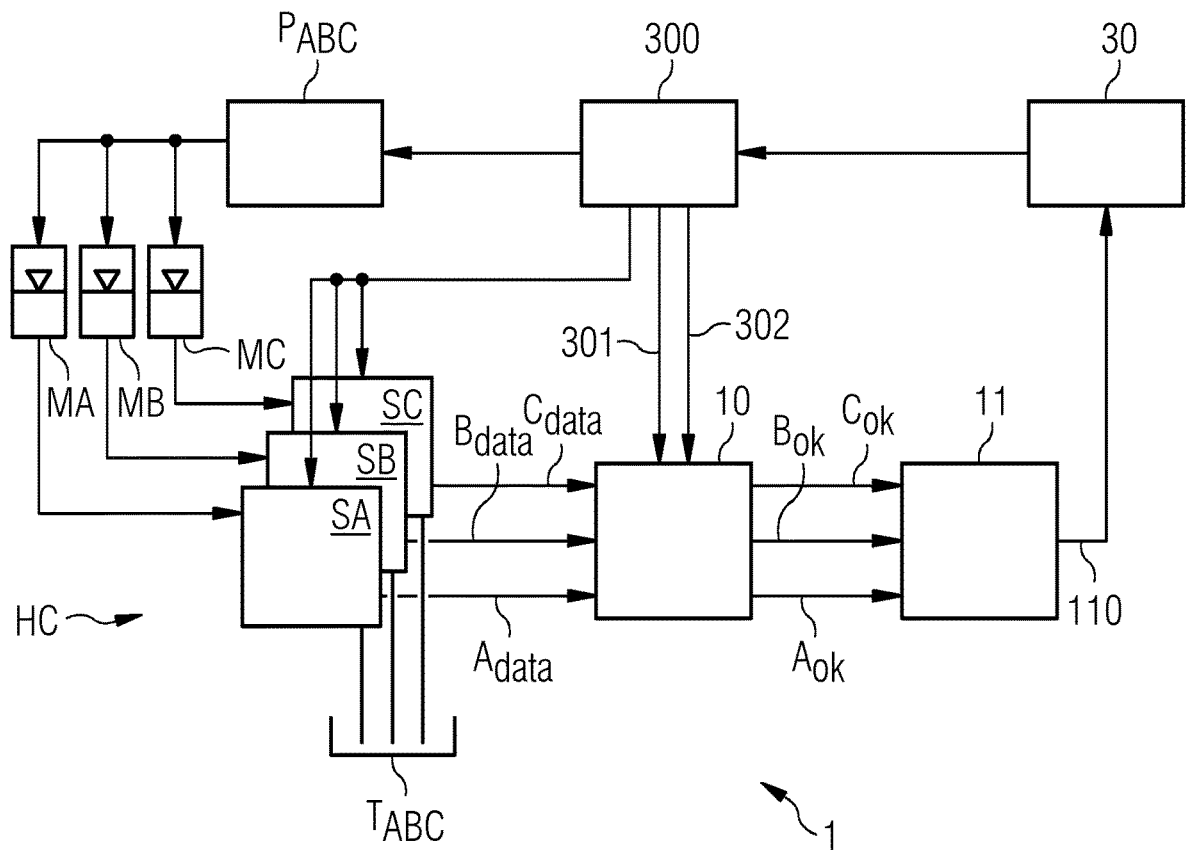
FIG. 1 shows a hydraulic arrangement of three pitch systems of a wind turbine.

For a pitch-control wind turbine with three rotor blades, there will be three pitch systems. FIG. 1 shows a simple overview of a hydraulic arrangement of three pitch systems SA, SB, SC of a wind turbine. Each pitch system SA, SB, SC may be assumed to comprise two parallel-connected hydraulic cylinders, as well as an arrangement of valves to regulate the direction of fluid flow. Each pitch system SA, SB, SC is fed from an accumulator $M_A$, $M_B$, $M_C$, and drains into a common tank $T_{ABC}$.

The accumulators $M_A$, $M_B$, $M_C$ and tank $T_{ABC}$ may be part of a closed circuit, and all relevant components may be arranged at a convenient location, for example inside the hub of the wind turbine. A scheduler module 300 of the wind turbine (or wind park controller) is used to schedule a functionality test for a selected pitch system, to regulate the hydraulic circuit (by driving the pump $P_{ABC}$ and by opening/closing valves of the pitch systems SA, SB, SC accordingly) and to inform an evaluation unit by telling it which pitch system is undergoing the functionality test, and when. Here, a first signal 301 identifies the pitch system scheduled for a functionality test, and a second signal 302 defines the duration of that functionality test.

The pressure level in the hydraulic cylinders of a pitch system SA, SB, SC is measured and output as a pressure reading $A_{data}$, $B_{data}$, $C_{data}$. These pressure readings are evaluated in an analysis unit 10. From signals 301, 302, the scheduler 300 knows which pitch system is scheduled for a functionality test, and when. With this information, the pressure readings $A_{data}$, $B_{data}$, $C_{data}$ can be interpreted to detect an anomaly. If the pressure levels of the two non-test pitch systems remain high, it can be assumed that the corresponding pitch cylinders are fully functional. If a pressure level of a non-selected pitch system drops during the functionality test, it can be assumed that the corresponding pitch cylinder is defective. After carrying out the functionality tests on all three pitch systems SA, SB, SC and simultaneously analysing the pressure readings $A_{data}$, $B_{data}$, $C_{data}$, the analysis unit 10 can report a cylinder status signal $A_{OK}$, $B_{OK}$, $C_{OK}$ for each pitch system. If all three status signal $A_{OK}$, $B_{OK}$, $C_{OK}$ are "high" or "logic 1", it may be assumed that all cylinders are functioning correctly. If one of these status signals $A_{OK}$, $B_{OK}$, $C_{OK}$ is "low" or "logic 0", it may be assumed that the corresponding pitch cylinder is leaky. An error reporting unit 11 then outputs a report 110 identifying the defective pitch system, and also identifying the wind turbine if this is one of several wind turbines of a wind park. A controller 30 may then schedule a service procedure for that wind turbine and regulate the operating parameters of the wind turbine as necessary.

Figure 2:
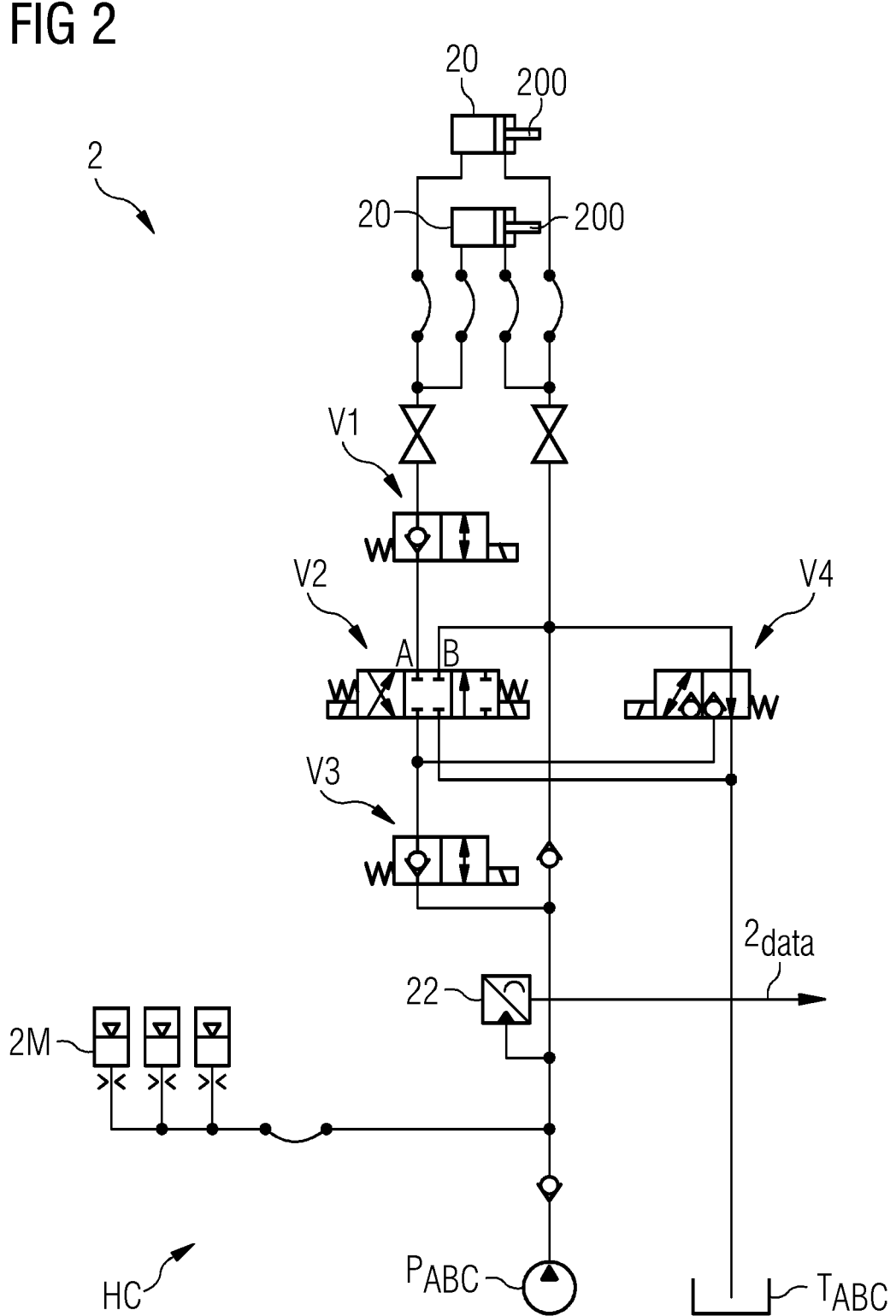
FIG. 2 shows a hydraulic circuit diagram of a pitch system of FIG. 1.

FIG. 2 shows a simplified hydraulic circuit diagram of a pitch system 2 of one of the rotor blades of a wind turbine, and can be any of the pitch systems SA, SB, SC of FIG. 1. The diagram shows a pair of hydraulic cylinders 20 in a parallel arrangement, i.e. both cylinders 20 fill simultaneously and drain simultaneously, so that their pistons move synchronously. A piston divides the interior volume of a cylinder 20 into a bottom chamber and a rod-side chamber. A system of valves V1, V2, V3, V4 can be regulated accordingly to achieve a desired piston position.

Here, each piston 200 is shown in its outermost "stop" position. To achieve this, hydraulic fluid (from the accumulator arrangement 2M on the lower left) is forced under pressure through a valve-regulated fluid line into the bottom chamber of the cylinder, so that the piston with its piston rod 200 is pushed towards the cylinder head end (towards the right in this diagram). The valves V1, V2, V3, V4 are then regulated to contain the pressurized fluid in the bottom chamber. The pressure is monitored by a pressure transducer 22 in the fluid line and reported as a pressure level reading $2_{data}$ (i.e. any of $A_{data}$, $B_{data}$, $C_{data}$). If a hydraulic cylinder 20 is healthy, the reported pressure reading $2_{data}$ will remain essentially constant at its maximum level until the valves V1, V2, V3, V4 are regulated to allow the fluid to drain from the bottom chamber again.

However, if the seal between the bottom chamber and the rod end chamber is damaged and no longer fully functional, fluid will pass from the bottom chamber to the rod end chamber, resulting in a drop in pressure which is registered by the manometer 22.

Embodiments of the invention are based on the insight that a cylinder leak in one pitch system can be detected as a "bonus" during a routine functionality test being performed on another pitch system. During a functionality test on a selected pitch system, its pistons must be pushed to their "stop" positions. Therefore, the pistons of the other two pitch systems will also be pushed to their "stop" positions. Embodiments of the invention make use of this fact and, instead of only evaluating the pressure reading from the pitch system that is undergoing the functionality test, pressure readings from the other two pitch systems are also recorded and evaluated. In the prior art, only the pressure reading from the pitch system currently undergoing a functionality test is collected and evaluated, and the pressure readings from the other two pitch systems not considered to be of any interest and are ignored.

Figure 3:
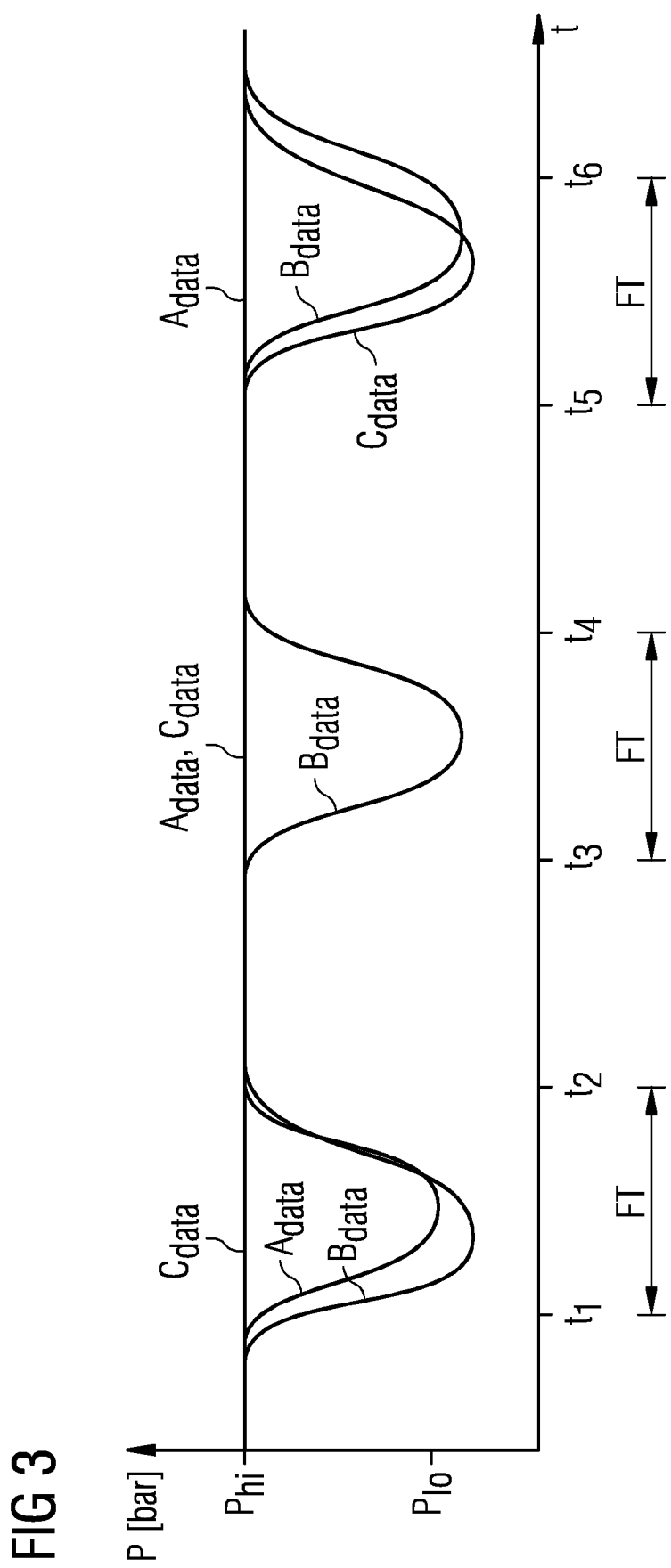
FIG. 3 shows graphs of cylinder pressure for the pitch systems of FIG. 1.

An exemplary sequence of functionality tests is illustrated in FIG. 3, which shows three pressure curves $A_{data}$, $B_{data}$, $C_{data}$ for the three pitch systems SA, SB, SC of FIG. 1, respectively. A scheduled functionality test is being performed on pitch system SA from time $t_1$ to time $t_2$, so that this pitch system SA is also referred to as the "selected pitch system". The other two pitch systems SB, SC are each referred to as a "non-selected pitch system". The functionality test requires that the pistons of the selected pitch system SA are pushed to their outermost "stop" position. Because the pitch systems SA, SB, SC are controlled by a common hydraulic circuit, the pistons of the non-selected pitch systems SB, SC are therefore also pushed to their outermost "stop" position. Ideally, the pressure in the non-selected pitch systems SB, SC would remain at a high level for the duration FT of the functionality test on the selected pitch system SA.

The cylinder pressure of the selected pitch system SA drops as expected towards a low level $P_{lo}$ during the functionality test. The diagram illustrates the effect of a damaged seal or other fault in a pitch cylinder of one of the non-selected pitch systems, in this case pitch system SB. Instead of remaining as expected at the high level $P_{hi}$ during the functionality test on pitch system SA, the pressure drops towards the low level $P_{lo}$, and this unexpected pressure drop can be interpreted as a sign that a pitch cylinder of this pitch system SB is "leaky".

The scheduled functionality test for the next pitch system, in this case pitch system SB, is performed from time $t_3$ to time $t_4$, so that pitch system SB is now the "selected pitch system" and pitch systems SA, SC are the "non-selected pitch systems". The cylinder pressure drops as expected during the functionality test on pitch system SB, while the cylinder pressures of pitch systems SA, SC appear healthy.

This shows that a leaky cylinder in a pitch system cannot be detected during a functionality test of that pitch system. \

The scheduled functionality test for the third pitch system, in this case pitch system SC, is performed from time $t_5$ to time $t_6$, so that pitch system SC is now the "selected pitch system" and pitch systems SA, SB are the "non-selected pitch systems". Again, instead of remaining at its maximum level $P_{hi}$ during the functionality test on pitch system SC, the pressure reading from pitch system SB drops towards the low level $P_{lo}$, giving further confirmation that it has leaky pitch cylinder.

A leak may be assumed if the pressure drops by more than 5% of the maximum value $P_{hi}$, i.e. the low pressure level $P_{lo}$ is less than 5% of the expected pressure level $P_{hi}$. For example, for an upper pressure level $P_{hi}$ of 170 bar, it may be assumed that there is a leak in pitch system B if, during a pitch capacity check on pitch system A, the pressure in pitch system B drops below 160 bar while the pressure in pitch system C stays above 170 bar.

The pressure level in the hydraulic cylinders of a pitch system SA, SB, SC is measured and output as a pressure reading $A_{data}$, $B_{data}$, $C_{data}$. This can be recorded and evaluated by modules of a suitable control arrangement. This might occur locally, for example in a local wind turbine controller. Alternatively, for the wind turbines of a wind park, such data $A_{data}$, $B_{data}$, $C_{data}$ may be collected and transmitted to a remote park controller for evaluation.

FIG. 4 shows a wind park 3 implementing an embodiment of the inventive leak detection arrangement. The wind park can have any number of wind turbines WT1, WT2, . . . , WTn that are regulated by a park controller 30. The scheduler 300 is implemented at the park controller 30, and schedules functionality tests for the pitch systems of the wind turbines WT1, WT2, . . . , WTn. Relevant information 301, 302 (along with any other relevant commands) is passed to the appropriate wind turbines WT1, WT2, . . . , WTn. During the functionality tests, the wind turbines WT1, WT2, . . . , WTn return pressure readings $A_{data}$, $B_{data}$, $C_{data}$. An evaluation unit 10 analyses these, and an error module can flag any suspected leaky cylinder so that a maintenance procedure can be planned in good time, avoiding the development of a more severe fault.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of detecting a leak in a hydraulic cylinder of a rotor blade pitch system of a wind turbine comprising a plurality of rotor blades, the method comprising:
    selecting a pitch system of the pitch systems to undergo a functionality test;
    actuating a fluid pump to move pistons of the hydraulic cylinders of the pitch systems to an outermost position;
    monitoring hydraulic cylinder pressure levels of non-selected pitch systems while performing the functionality test on the pitch system; and
    analyzing the hydraulic cylinder pressure levels of the pitch systems to detect a drop in pressure in a pitch cylinder of a non-selected pitch system.

2. The method according to claim 1, wherein a cylinder pressure level is reported by a pressure sensor of a corresponding pitch system.

3. The method according to claim 1, wherein a pressure sensor is arranged in a fluid supply line connecting a pressurized fluid source to the pitch cylinders of the pitch system.

4. The method according to claim 1, further comprising reporting a cylinder fault when a drop in pressure is observed for the non-selected pitch system.

5. A pitch-controlled wind turbine comprising a plurality of rotor blades, wherein each rotor blade is turned by a dedicated pitch system, and wherein the dedicated pitch systems is part of a common hydraulic circuit, the pitch-controlled wind turbine comprising:
    a scheduler module configured to schedule a functionality test for a selected pitch system and to regulate a hydraulic circuit to move pistons of hydraulic cylinders of each pitch system; and
    a leak detection arrangement to identify a faulty pitch system during a functionality test, the leak detection arrangement comprises an evaluation unit configured to receive:
        a first input signal identifying a selected pitch system scheduled for a functionality test;
        a second input signal defining a duration of the functionality test; and
        pressure level readings of the hydraulic cylinders of each pitch systems;
    wherein the evaluation unit is further configured to track a temporal progression of a pressure reading and to identify a fault-indicative reduction in pressure.

6. The pitch-controlled wind turbine according to claim 5, wherein a fault-indicative reduction in pressure is indicated when a pressure reading of a non-selected pitch system decreases to less than 5% of an initial value during the functionality test.

7. The pitch-controlled wind turbine according to claim 6, comprising an error reporting unit configured to issue an error report to a wind turbine controller, the error report identifying the non-selected pitch system for which the fault-indicative reduction in pressure was observed during the functionality test.

8. The pitch-controlled wind turbine according to claim 5, wherein the scheduler module is configured to schedule a functionality test for a pitch system at intervals of at most 100-120 hours.

\* \* \* \* \*